Figure 1:
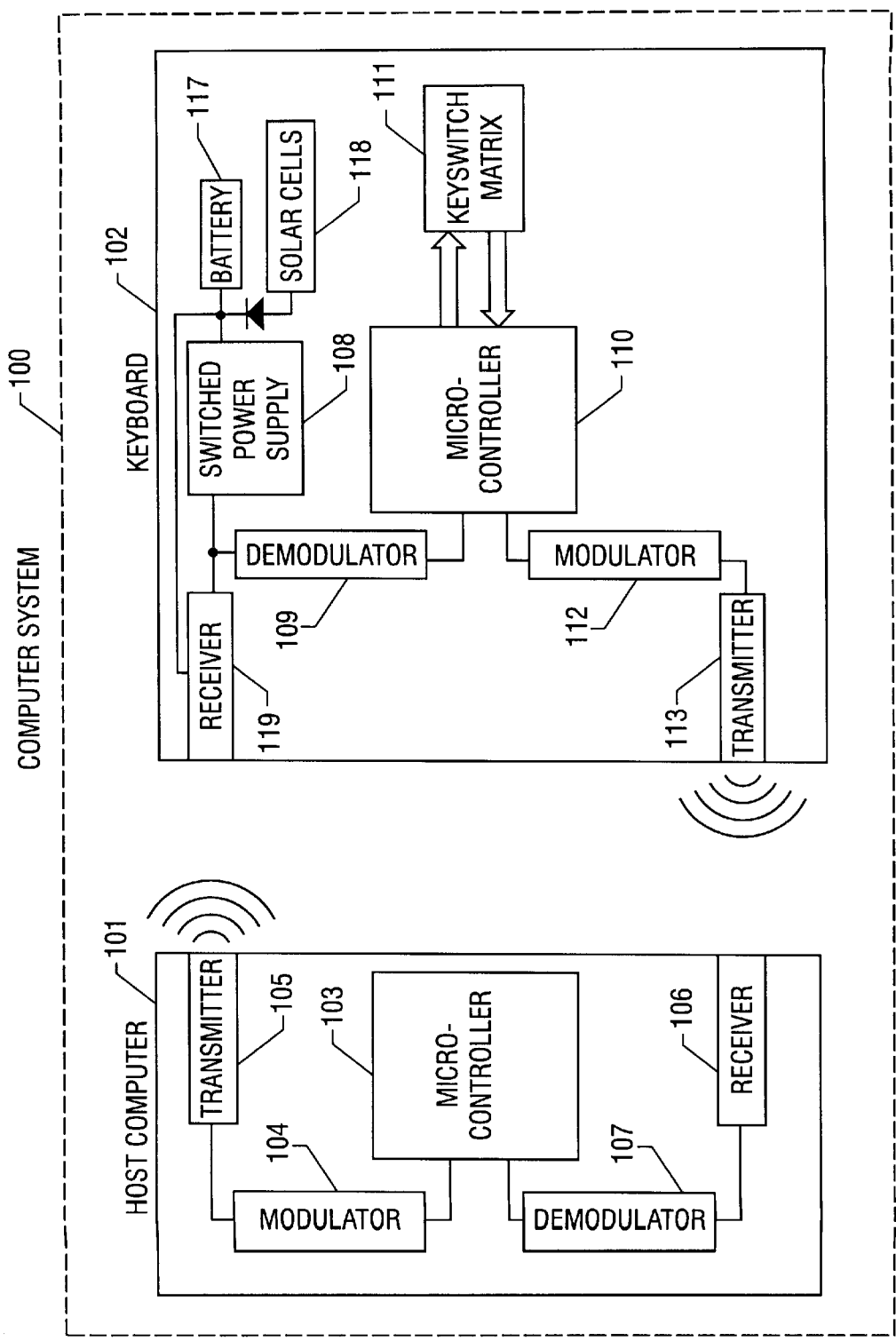

United States Patent [19]
Klein

[11] Patent Number: 5,958,023
[45] Date of Patent: Sep. 28, 1999

[54] METHOD FOR LOW POWER WIRELESS KEYBOARD THAT DETECTS A HOST COMPUTER QUERY FOR THE STATE OF A KEY THEN POWERS UP TO DETERMINE AND TRANSMIT BACK THE STATE OF THAT KEY

[75] Inventor: Dean A. Klein, Eagle, Id.

[73] Assignee: Micron Electronics, Inc., Nampa, Id.

[21] Appl. No.: 08/779,465

[22] Filed: Jan. 7, 1997

[51] Int. Cl.$^6$ ................................................. G06F 13/14
[52] U.S. Cl. ............................ 710/18; 710/73; 713/320; 341/22; 359/142
[58] Field of Search ................. 395/750.02, 750.04, 395/865, 893; 341/22; 359/142; 713/320; 710/18, 73

[56] References Cited

U.S. PATENT DOCUMENTS

| | | | |
|---|---|---|---|
| 3,596,256 | 7/1971 | Alpert et al. | 395/865 |
| 3,921,166 | 11/1975 | Volpe | 341/26 |
| 4,099,437 | 7/1978 | Stavron et al. | 84/617 |
| 4,357,849 | 11/1982 | Ezawa et al. | 84/617 |
| 4,419,736 | 12/1983 | Christensen et al. | 364/710.13 |
| 4,461,013 | 7/1984 | Lese et al. | 375/306 |
| 4,514,732 | 4/1985 | Hayes, Jr. | 375/232 |
| 4,599,647 | 7/1986 | George et al. | 380/10 |
| 4,641,364 | 2/1987 | Bass et al. | 455/32.1 |
| 4,656,472 | 4/1987 | Walton | 340/825.34 |
| 5,056,057 | 10/1991 | Johnson et al. | 395/893 |
| 5,081,628 | 1/1992 | Maekawa et al. | 371/34 |
| 5,189,543 | 2/1993 | Lin et al. | 359/142 |
| 5,341,167 | 8/1994 | Guichard et al. | 348/14 |
| 5,365,230 | 11/1994 | Kikinis | 341/22 |
| 5,406,273 | 4/1995 | Nishida et al. | 340/825.51 |
| 5,440,502 | 8/1995 | Register | 364/708.1 |
| 5,457,801 | 10/1995 | Aihara | 395/750.04 |
| 5,585,792 | 12/1996 | Liu et al. | 341/22 |
| 5,591,217 | 1/1997 | Barreras | 607/61 |
| 5,630,144 | 5/1997 | Woog et al. | 395/750.02 |
| 5,659,883 | 8/1997 | Walker et al. | 455/59 |
| 5,684,471 | 11/1997 | Bernardi et al. | 340/825.72 |
| 5,708,458 | 1/1998 | Vrbanac | 345/156 |
| 5,737,107 | 4/1998 | Umeda | 359/146 |
| 5,757,354 | 5/1998 | Kawamura | 345/126 |

OTHER PUBLICATIONS

Mendelson, "Wireless Keyboard & Mouse: Unththered Input.", PC Magazine, Ziff–Davis Publishing Company, vol. 14, p.49, Jul. 1995.

*Primary Examiner*—Thomas C. Lee
*Assistant Examiner*—Albert Wang
*Attorney, Agent, or Firm*—Arnold, White & Durkee

[57] ABSTRACT

A method of determining the state of a keyboard key is disclosed. First, a signal that identifies at least one keyboard key is transmitted. Then, the signal is detected. Next, at least one keyboard electrical component is powered up. Then, a signal that contains the state of the at least one keyboard key is transmitted. Finally, power is removed from the at least one keyboard electrical component.

20 Claims, 5 Drawing Sheets

5,958,023

METHOD FOR LOW POWER WIRELESS KEYBOARD THAT DETECTS A HOST COMPUTER QUERY FOR THE STATE OF A KEY THEN POWERS UP TO DETERMINE AND TRANSMIT BACK THE STATE OF THAT KEY

1. FIELD OF THE INVENTION

The invention relates in general to the field of computing, and more particularly, to the use of a wireless keyboard with a low power consumption.

2. BACKGROUND OF THE INVENTION

The vast majority of users input commands and data into modern computers by typing on a keyboard. When a user depresses a key on a keyboard, a change in the current flowing through the circuit associated with that key occurs. The group of circuits associated with all the keys on a keyboard is known as a keyswitch matrix. The keyswitch matrix may be conveniently divided into rows and columns for efficient addressing. A microcontroller that is built into the keyboard, such as the Intel 8048, periodically scans the keyswitch matrix. Thus, the microcontroller detects the change in current from a depressed key. To distinguish between a current change that results from a depressed key and an aberrant current fluctuation that results from key bounce, the microcontroller scans the keyswitch matrix hundreds of times each second. Only current changes that last for two or more scans are acted upon by the microcontroller.

Depending on which key circuit carries the signal to the microcontroller, the microcontroller generates a number, called a scan code. Each key has a unique scan code. Next, the microcontroller stores the scan code in a keyboard memory buffer and then loads the scan code into a port that can be read by the computer's BIOS. The microcontroller then sends an interrupt signal over the keyboard cable to tell the BIOS that a scan code is waiting for it. The interrupt signal tells the BIOS to stop performing other operations and divert its attention to reading the scan code. Next, the BIOS reads the scan code from the keyboard port and sends a signal to the keyboard that tells the microcontroller that it may delete the scan code from its buffer. The BIOS then translates the scan code into an ASCII code that is placed in a memory buffer. Finally, the operating system retrieves the ASCII code. The above process is repeated in a periodic manner.

While the above method is utilized by almost all modern computers, the above method is not optimal. The primary disadvantage of the above method is that the electrical components in the keyboard have a significant power consumption. Today, in an effort to be environmentally conscious and to reduce utility bills, it has become important to reduce the power consumption of computers. In addition, the above method is not optimal for a wireless keyboard because any such keyboard utilizing the above method would have a very limited battery life. Thus, a need exists for a method and apparatus for reducing keyboard power consumption.

3. SUMMARY OF INVENTION

A method of determining the state of a keyboard key is disclosed. First, a signal that identifies at least one keyboard key is transmitted. Then, the signal is detected. Next, at least one keyboard electrical component is powered up. Then, a signal that contains the state of the at least one keyboard key is transmitted. Finally, power is removed from the at least one keyboard electrical component.

4. BRIEF DESCRIPTION OF DRAWINGS

FIG. 1 presents a diagram of a computer system including a host computer and a keyboard.

Figure 2:
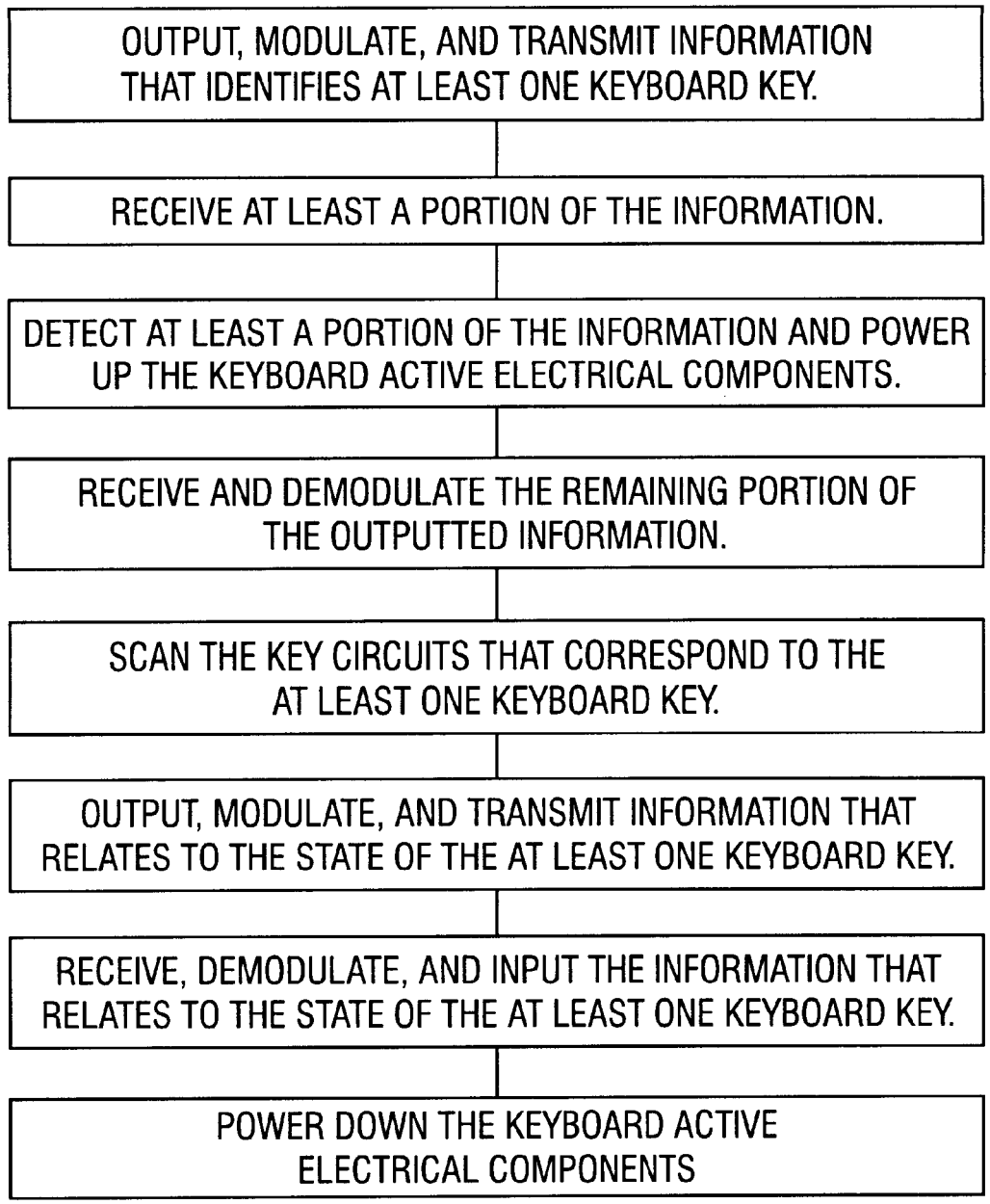

FIG. 2 presents a flow diagram of a mode of operation of the computer system of FIG. 1.

Figure 3:
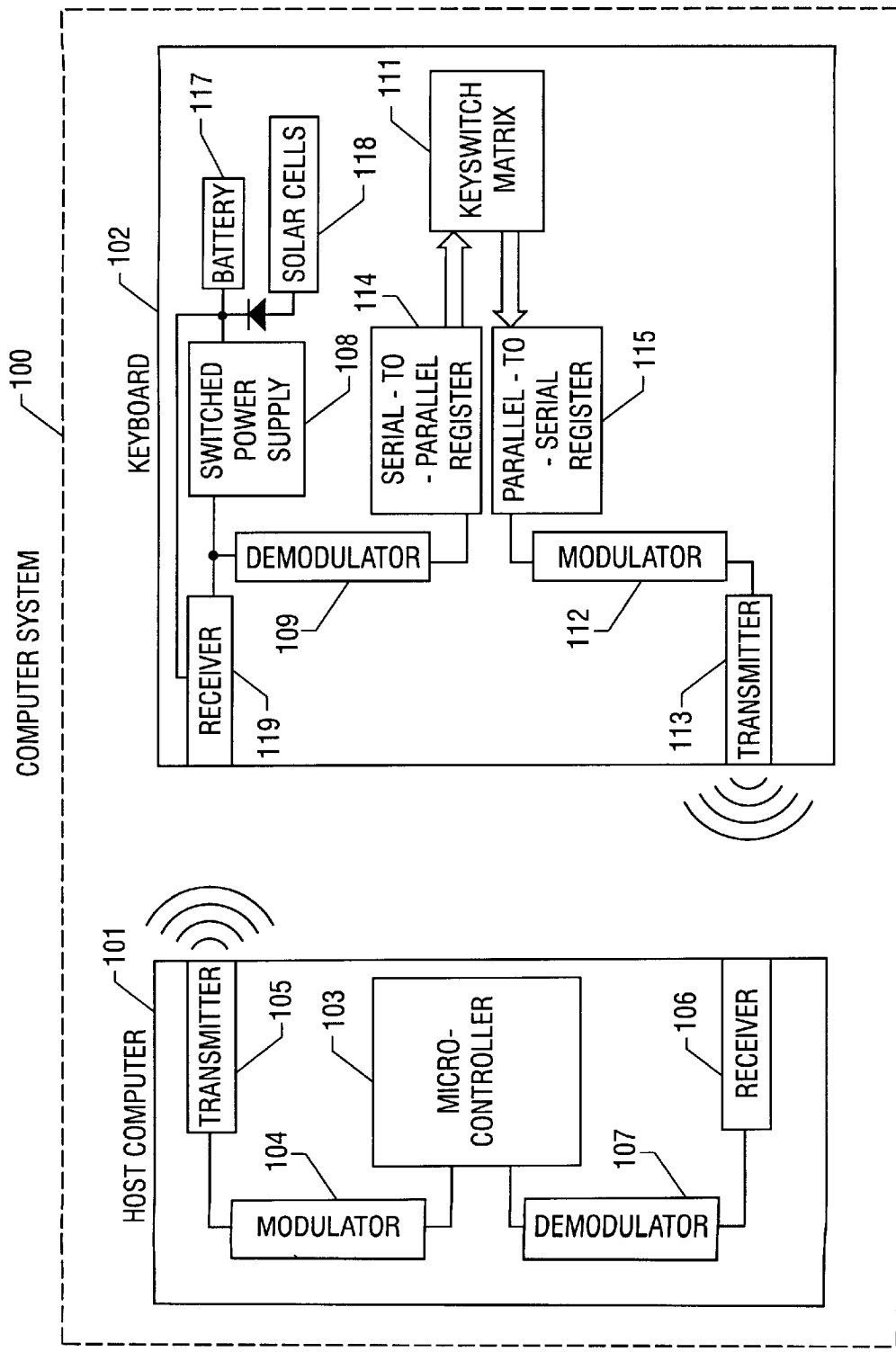

FIG. 3 presents a second embodiment of a computer system.

Figure 4:
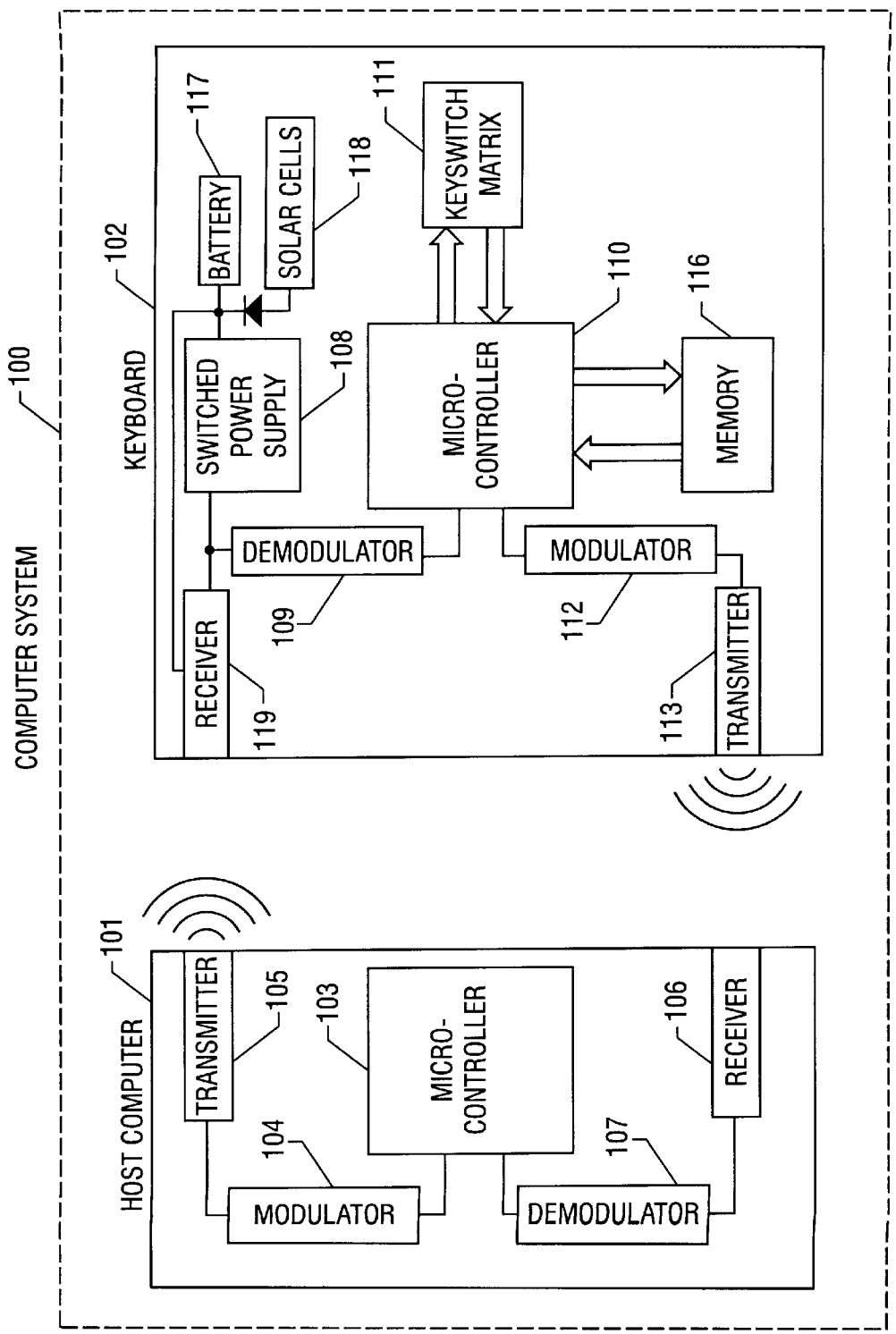

FIG. 4 presents a third embodiment of a computer system.

Figure 5:
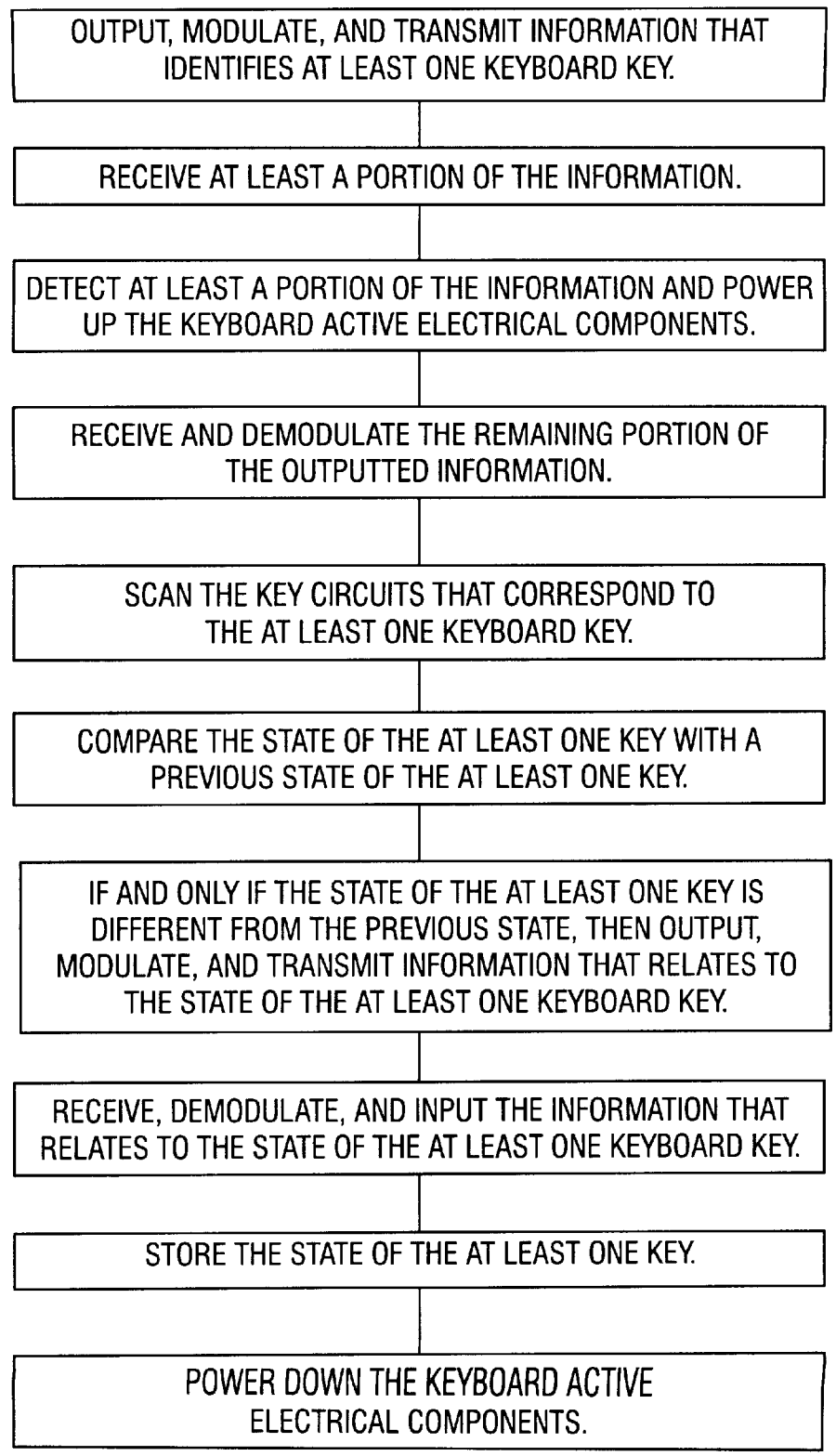

FIG. 5 presents a mode of operation of the computer system of FIG. 4.

5. DETAILED DESCRIPTION OF SPECIFIC EMBODIMENTS

Illustrative embodiments of the invention are described below. In the interest of clarity, not all features of an actual implementation are described. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

5.1 Description of a First Embodiment of the Invention

FIG. 1 presents a diagram of a computer system 100. The computer system 100 includes a host computer 101 and a keyboard 102.

5.1.1 Host Computer

Referring again to FIG. 1, the host computer 101 includes a conventional microcontroller 103 such as an Intel 8042, Intel 80C51, or Intel 80C48 microcontroller. The host computer microcontroller 103 is coupled to a modulator 104. Typically, a serial port of the host computer microcontroller 103 is connected to the input of the modulator 103. The host computer modulator 104 may be any conventional modulator such as an amplitude, frequency, or phase modulator. The output of the host computer modulator 104 is coupled to the input of a conventional radio frequency (hereinafter RF) transmitter 105. However, in some embodiments, the host computer RF transmitter 105 may need to have sufficient transmission power to reliably transmit RF signals to a RF receiver that is separated from the host computer's RF transmitter 105 by a distance of approximately 6 feet.

The host computer 101 also includes a conventional RF receiver 106 that is suitable to receive the signals transmitted from the keyboard RF transmitter 113 that is discussed in section 5.1.2. The output of the host computer RF receiver 106 is coupled to a conventional amplitude, frequency, or phase demodulator. Typically, the host computer demodulator 107 is of the same type as the host computer modulator 104, i.e., if the host computer modulator 104 is an amplitude modulator, then the host computer demodulator 107 will also be an amplitude demodulator. The output of the host computer demodulator 107 is coupled to the host computer microcontroller 103. Typically, the output of the host computer demodulator 107 is connected to a second serial port of the host computer microcontroller 103.

The host computer 101 will typically include a general purpose microprocessor that is conventionally coupled to the host computer microcontroller 103. (The general purpose microprocessor is not shown in the Figures.) For example, the host computer 101 may include a Pentium™ microprocessor, a Pentium Pro™ microprocessor, a Motorola Power PC™ microprocessor, a DEC ALPHA microprocessor, or a MIPS microprocessor.

5.1.2 Keyboard

Referring again to FIG. 1, the keyboard 102 includes a conventional RF receiver 119. The keyboard RF receiver 119 is configured so that it can receive the RF signals transmitted by the host computer RF transmitter 105. The output of the keyboard RF receiver 119 is coupled to the enable input of a switched power supply 108. The switched power supply 108 is also coupled to and provides electrical power to all the active electrical components of the keyboard 102. The switched power supply 108 may be any conventional switched power supply that is suitable for powering the active electrical components of the keyboard 102. The switched power supply 108 will typically include a linear, switching, or other conventional type of power supply.

As shown in FIG. 1, the output of the keyboard RF receiver 119 is coupled to the input of a demodulator 109. The keyboard demodulator 109 is of the same type as the host computer modulator 104 and is coupled to a conventional microcontroller 110 such as an Intel 80C48. Typically, the output of the keyboard demodulator 109 is coupled to a serial input port of the keyboard microcontroller 110. The keyboard microcontroller 110 is also coupled to the keyboard keyswitch matrix 111. Typically, a parallel output of the keyboard microcontroller 110 is connected to the address lines of the keyswitch matrix 111. In addition, a parallel input of the keyboard microcontroller 110 is coupled to the data lines of the keyswitch matrix 111.

The keyboard microcontroller 110 is further coupled to a modulator 112 that is of the same type as the host computer demodulator 119. Typically, a serial output port of the keyboard microcontroller 110 is coupled to the input of the keyboard modulator 112. The output of the keyboard modulator 112 is coupled to a conventional RF transmitter 113 that is suitable for transmitting RF signals to the host computer RF receiver 106. In some embodiments, the keyboard RF transmitter 113 may need to have sufficient power to reliably transmit RF signals to the host computer RF receiver 106 that is separated from the keyboard RF transmitter 113 by a distance of approximately 6 feet.

5.2 Description of the Operation of the First Embodiment of the Invention

A flow diagram of a mode of operation of the first embodiment of the invention is presented in FIG. 2. Referring to FIG. 2, the host computer microcontroller 103 first outputs the identity of at least one keyboard key. It may be optimal to identify several keyboard keys by specifying a keyswitch matrix row. Thus, the keys that are associated with the key circuits in the specified keyswitch row can be efficiently identified.

Referring again to FIG. 2, the outputted identity of the keys is then modulated and transmitted. An initial portion of the resulting RF signal is received by the keyboard RF receiver 119. This initial portion is detected by the switched power supply 108. When such a detection is made, the switched power supply 108 switches on and provides power to the active electrical components in the keyboard. After the switched power supply 108 switches on, the remaining portion of the RF signal is demodulated and inputted into the keyboard microcontroller 110. Detecting an initial portion of a signal, switching on a switched power supply, and then receiving the remaining portion of a signal is known by those skilled in the art.

Next, the keyboard microcontroller 110 scans the key circuits in the keyswitch matrix 111 that correspond to the identified keys. Thus, the keyboard microcontroller 110 determines the state of the identified keys. Next, the keyboard microcontroller 110 outputs the state of the identified keys to the keyboard modulator 112 which creates a modulated signal.

Referring again to FIG. 2, the resulting modulated signal is then transmitted. Next, the host computer RF receiver 106 receives the signal that includes the state of the identified keys. This signal is then demodulated and inputted into the host computer microcontroller 103. After the keyboard RF transmitter 113 has finished transmitting, the switched power supply 108 switches off and stops providing power to the keyboard's active electrical components.

By repeating the above procedure, it is possible for the host computer microcontroller 103 to determine the state of all the keyboard keys. It may be optimal to repeat the above process every 20 milliseconds.

5.3 Description of a Second Embodiment of the Invention

A second embodiment of the invention is shown in FIG. 3. In this embodiment, the keyboard microcontroller 110 is replaced by a conventional serial-to-parallel register 114 and a conventional parallel-to-serial register 115. Use of a 74HCT164 serial-to-parallel register and a 74HCT166 parallel-to-serial register may be optimal.

In this embodiment, the serial output of the keyboard demodulator 109 is input into the serial-to-parallel register 114. The resulting parallel data is then used as a row address into the keyswitch matrix 111. The keyswitch matrix 111 will then generate parallel column data that is converted into serial data by the parallel-to-serial register 115. This serial data is then output to the keyboard modulator 112.

5.4 Description of a Third Embodiment of the Invention

A third embodiment of the invention is shown in FIG. 4. In this embodiment, memory 116 is coupled to the keyboard microcontroller 110. The memory 116 may be any conventional memory device, however, use of a DRAM device may be optimal.

As shown in FIG. 5, in this embodiment, after the keyboard microcontroller 110 scans the key circuits in the keyswitch matrix 111 that correspond to identified keys and detects whether the identified keys are depressed, the keyboard microcontroller 110 compares the state of the keys with the state of the keys stored in memory 116 during a previous cycle. Next, the keyboard microcontroller 110 outputs information related to the state of the identified keys to the keyboard modulator 112 if and only if the state of the identified keys is different from the state of the identified keys that was previously stored in memory 116. Finally, the keyboard microcontroller 110 stores the current state of the identified keys in memory 116. In one embodiment, if the state of any key in row of a keyswitch matrix 111 is different from the corresponding state of the keys in that row that was previously stored in memory 116, then the keyboard microcontroller 110 outputs the state of the keys in that row. By outputting the state if and only if the above condition is true, then transmissions are reduced. Thus, the power required to operate the keyboard 102 is also reduced.

5.5 Alternative Embodiments of the Invention

In one embodiment, the keyboard 110 will output scan codes of the depressed keys. However, in other embodiments the outputted state of the identified keys need not include scan codes. The outputted state of the identified keys need only include information that is sufficient to allow the host computer microcontroller 103, or possibly the host computer microprocessor, to determine the state of the identified keys.

In another embodiment, the keyboard microcontroller 110 may perform additional scans of the keyswitch matrix 111 to distinguish between a current change that results from a depressed key and an aberrant current fluctuation. Only current changes that last for two or more scans would be considered to result from one or more depressed keys.

In another embodiment, the switched power supply 108 will receive electrical power from a battery 117. In still another embodiment, the switched power supply 108 may receive power from one or more solar cells 118. In yet still another embodiment, the switched power supply may receive power from a RF signal. This RF signal may be transmitted from the host computer RF transmitter 105 or another RF transmitter that may or may not be coupled to the host computer 101. In still another embodiment, the switched power supply 108 may receive power from a plurality of the above sources. For example, power may be supplied to the switched supply 108 from a battery 117 that is recharged by solar cells 118. Alternatively, power may be supplied to the switched supply 108 from a battery 117 that is recharged by a RF signal.

In another embodiment, the switched power supply 108 will switch off a predetermined time after switching on. Alternatively, the switch power supply 108 will switch off after one or more events. For example, the switched power supply 108 may switch off after the keyboard RF transmitter 113 completes transmitting.

In another embodiment, the keyboard 102 does not have a power switch. In this embodiment, when the host computer 101 is powered down, then the keyboard 102 will be inactive.

In another embodiment, the RF transmitters 105 and 113 and receivers 106 and 119 may be replaced with infrared transmitters and receivers.

In another embodiment, the data input into the RF transmitters 105 and 113 may be encoded for reliability.

6.0 Remarks

One primary advantage of the invention is that it reduces the power consumption of the keyboard. In particular, an embodiment of the invention that utilizes a serial-to-parallel register and a parallel-to-serial register has minimal power consumption. The significant power reduction results from the fact that the keyboard's active electrical components are powered only during the time that they are actually in use. When the active electrical components are not in use, they are powered down. By reducing the power consumption, the battery life of the keyboard will be significantly extended. In addition, if solar cells and/or a RF signal is used to recharge the keyboard battery, then the keyboard battery may last indefinitely.

Another advantage of the invention is that it allows a keyboard to be located remotely from a host computer. Because no keyboard cable is required to connect the keyboard to the host computer, remotely locating the keyboard will be possible.

It will be appreciated by those of ordinary skill in the art having the benefit of this disclosure that numerous variations from the foregoing illustration will be possible without departing from the inventive concept described therein. Accordingly, it is the claims set forth below, and not merely the foregoing illustration, which are intended to define the exclusive rights claimed in this application program.

What is claimed is:

1. A method of determining the state of a keyboard key comprising:

(a) transmitting a wireless first signal that identifies at least one keyboard key;

(b) detecting the first signal; then (c) providing power to at least a keyboard demodulator;

(d) transmitting a wireless second signal that contains the state of the at least one keyboard key; and (e) removing power from at least a keyboard demodulator.

2. The method of claim 1 wherein the step of transmitting a first signal that identifies the at least one keyboard key includes transmitting a RF signal that identifies the at least one keyboard key.

3. The method of claim 1 wherein the step of transmitting a first signal that identifies at least one keyboard key includes transmitting an infrared signal that identifies the at least one keyboard key.

4. The method of claim 1 wherein the step of transmitting a first signal that identifies at least one keyboard key includes transmitting a signal that identifies a row of a keyswitch matrix.

5. The method of claim 1 wherein the step of transmitting a first signal that identifies at least one keyboard key includes transmitting a signal that identifies at least one row of a keyswitch matrix.

6. A method of determining the state of a keyboard key comprising:

(a) transmitting a wireless first signal that identifies at least one keyboard key;

(b) detecting the first signal; then (c) providing power to at least a keyboard demodulator;

(d) determining the state of the at least one keyboard key;

(e) transmitting a wireless second signal that contains the state of the at least one keyboard key; and (f) removing power from at least a keyboard demodulator.

7. The method of claim 6 wherein the step of transmitting the first signal that identifies at least one keyboard key includes transmitting a RF signal that identifies the at least one keyboard key.

8. The method of claim 6 wherein the step of transmitting the first signal that identifies at least one keyboard key includes transmitting an infrared signal that identifies the at least one keyboard key.

9. The method of claim 6 wherein the step of transmitting the first signal that identifies at least one keyboard key includes transmitting a signal that identifies a row of a keyswitch matrix.

10. The method of claim 6 wherein the step of transmitting the first signal that identifies at least one keyboard key includes transmitting a signal that identifies at least one row of a keyswitch matrix.

11. The method of claim 6 wherein the step of determining the state of the at least one keyboard key includes scanning at least one key circuit in the keyswitch matrix.

12. The method of claim 6 wherein the step of determining the state of the at least one keyboard key includes scanning at least one key circuit that is associated with the at least one keyboard key.

13. The method of claim 6 wherein the step of determining the state of the at least one keyboard key includes converting parallel data from a keyswitch matrix into serial data by a parallel-to-serial register.

14. A method of determining the state of a keyboard key comprising:

(a) transmitting a wireless first signal that identifies at least one keyboard key;

(b) detecting the first signal; then (c) providing power to at least a keyboard demodulator;

(d) determining the state of the at least one keyboard key;

(e) if the state of the at least one keyboard key is different from a previously stored state of the at least one keyboard key, then transmitting a wireless second signal that contains the state of the at least one keyboard key;

(f) storing the state of the at least one keyboard key; and (g) removing power from at least a keyboard demodulator.

15. The method of claim 14 wherein the step of transmitting the first signal that identifies at least one keyboard key includes transmitting a RF signal that identifies the at least one keyboard key.

16. The method of claim 14 wherein the step of transmitting the first signal that identifies at least one keyboard key includes transmitting an infrared signal that identifies the at least one keyboard key.

17. The method of claim 14 wherein the step of transmitting the first signal that identifies at least one keyboard key includes transmitting a signal that identifies a row of a keyswitch matrix.

18. The method of claim 14 wherein the step of transmitting the first signal that identifies at least one keyboard key includes transmitting a signal that identifies at least one row of a keyswitch matrix.

19. The method of claim 14 wherein the step of determining the state of the at least one keyboard key includes scanning at least one key circuit in the keyswitch matrix.

20. The method of claim 14 wherein the step of determining the state of the at least one keyboard key includes scanning at least one key circuit that is associated with the at least one keyboard key.

* * * * *